United States Patent [19]

Ensinger

[11] Patent Number: 4,628,348
[45] Date of Patent: Dec. 9, 1986

[54] LUMINANCE CLIPPER WITH COLOR SUBCARRIER FILTER TO PREVENT CLIPPING OF SUBCARRIER

[75] Inventor: James W. Ensinger, Roselle, Ill.

[73] Assignee: Zenith Electronics Corporation, Glenview, Ill.

[21] Appl. No.: 718,682

[22] Filed: Apr. 2, 1985

[51] Int. Cl.[4] .......................... H04N 9/77; H04N 5/16
[52] U.S. Cl. .................................... 358/39; 358/21 R
[58] Field of Search ................ 358/21 R, 36, 39, 170, 358/34, 38

[56] References Cited

U.S. PATENT DOCUMENTS

| | | | |
|---|---|---|---|
| 3,290,433 | 12/1966 | De France et al. | 358/21 |
| 3,760,094 | 9/1973 | Skerlos | 358/36 |
| 3,980,815 | 9/1976 | Kaneko | 358/170 |
| 4,484,216 | 11/1984 | Rumland | 358/39 |

Primary Examiner—John W. Shepperd

[57] ABSTRACT

A baseband color video signal processor includes a selective transistor clipper for holding luminance components to a maximum level. The base of the transistor is operated at a first voltage below the desired maximum level. A tuned circuit, tuned to the frequency of the chrominance subcarrier, is connected in its emitter-collector path of the transistor for isolating it from chrominance components in the color video signal.

3 Claims, 3 Drawing Figures

LUMINANCE CLIPPER WITH COLOR SUBCARRIER FILTER TO PREVENT CLIPPING OF SUBCARRIER

BACKGROUND OF THE INVENTION

This invention relates generally to color video processing circuits and specifically to a luminance clipper in a color video processing circuit for clipping super white signals, that is, signals in excess of 100 IRE units, without affecting color.

In many applications it is necessary to prevent peak white signals, which may be produced from a variety of sources, most notably noise, from causing interference in color video processing circuits. A special problem occurs where a baseband color video signal including luminance information, a color subcarrier and such a peak white noise signal is to be applied to a modulator. The peak white signal overloads the modulator and results in a very disturbing audio buzz. The condition is often encountered with satellite receivers where the composite color video signal from the satellite is remodulated and applied to a cable television system, for example. The condition may also occur in some video cassette recorders where signals including color and luminance information are remodulated to other television carrier frequencies, A common prior art circuit includes an expensive comb filter to separate the luminance signal components from the chrominance signal components, a clipper to clip the luminance signal components to a desired level and an adder for recombining the chrominance signal components and the clipped luminance signal components. That circuit obviates distortion of the chrominance signal components that would occur if the combined luminance and chrominance signal components were clipped.

Another prior art circuit applies the combined luminance and chrominance signal components to a circuit having two branches, one including a color bandpass filter and the other including a 3.58 MHz color trap, the outputs of both branches being recombined in an adder. This circuit is also expensive in that it includes a bandpass filter, a trap and an adder, but has the additional undesirable attribute that all of the luminance signal components are degraded since they must pass through the 3.58 MHz color trap.

As will be seen, the circuit of the invention provides a very simple low cost alternative for accomplishing the same function, that is, for clipping the luminance signal components in a composite color video signal at a predetermined threshold level while having substantially no effect on the passage of the color signal components.

OBJECTS OF THE INVENTION

A principal object of this invention is to provide a novel video circuit for processing a color television signal.

Another object of this invention is to provide a video clipper circuit that substantially only affects luminance signal components.

A further object of this invention is to provide a low cost circuit for processing a baseband color video signal.

BRIEF DESCRIPTION OF THE DRAWINGS

Other objects and advantages of the invention will be apparent upon reading the following description in conjunction with the drawings in which.

DESCRIPTION OF THE PREFERRED EMBODIMENT

Figure 1:
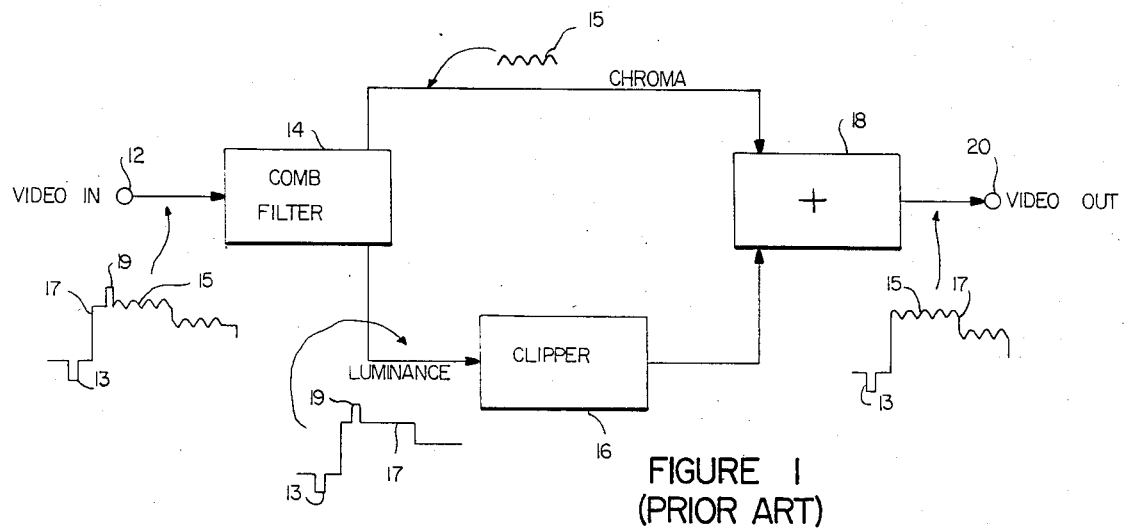
FIG. 1 is a simplified block diagram of a prior art circuit for processing a color video signal.

Referring to FIG. 1, a video processing circuit includes an input terminal 12 at which is developed a baseband color video signal having a luminance component and a chrominance component in the form of a modulated 3.58 MHz subcarrier. Terminal 12 is connected to a comb filter 14 which acts to separate the chrominance component from the luminance component and to direct them along different paths as illustrated. The luminance component is supplied to a clipper 16 which assures that the luminance component does not rise above a predetermined voltage threshold level. The output of clipper 16 and the chrominance component from comb filter 14 are supplied to an adder circuit 18 where they are recombined to form a luminance-clipped baseband color video signal which is applied to an output terminal 20. As illustrated at various points in the circuit, the video signal includes a negative-going sync pulse 13 and a chrominance component consisting of a modulated 3.58 MHz subcarrier "riding on" a luminance component 17. For purposes of illustration, a large luminance peak 19 corresponding to noise, is shown. Luminance peak 19 extends above the highest level of luminance component 17 and must be removed to prevent the audio buzz above-mentioned. In the output waveform, luminance peak 19 has been removed by the action of clipper 16. The chrominance component 15 remains substantially unchanged during the process and both positive and negative portions of its modulation envelope are passed on to adder 18.

The prior art circuit performs quite well but, as mentioned, incorporates an expensive comb filter and an adder circuit. These elements add about $10.00 to the cost of the circuit and therefore significantly impact the consumer cost. As will be seen, the circuit of the invention produces the same result at a small fraction of the cost of the prior art circuit.

Figure 2:
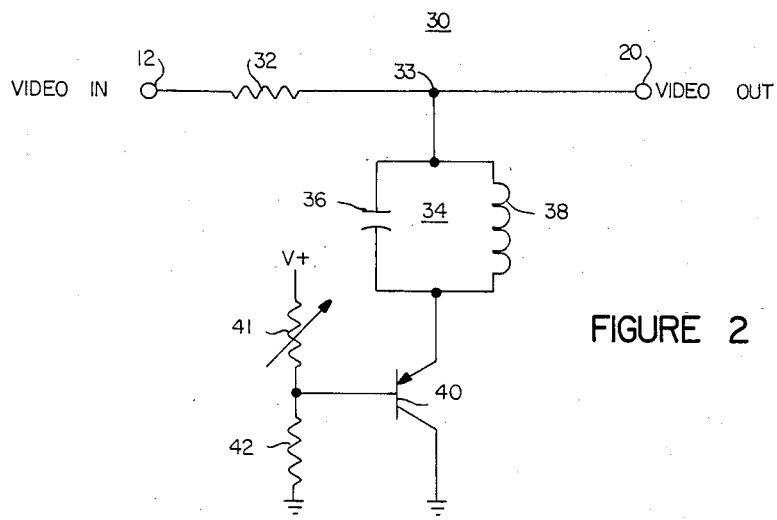
FIG. 2 is a schematic diagram of the circuit of the invention.

In FIG. 2, video input terminal 12 and video output terminal 20 have connected between them a color video processor 30 of much simpler design. Specifically, a resistor 32 is connected between input terminal 12 and output terminal 20, with an intermediate terminal 33 connected between one end of resistor 32 and output terminal 20. A tuned circuit 34, consisting of a parallel arrangement of a capacitor 36 and an inductor 38, is connected between terminal 33 and the emitter electrode of a transistor 40. Thus, the emitter of transistor 40 is connected to the lower end of tuned circuit 34 and its collector electrode is connected to ground. The base electrode of transistor 40 is connected to the junction of a voltage divider, consisting of a variable resistor 41 and a fixed resistor 42 serially connected between a source of voltage V+ and ground. Tuned circuit 34 is tuned to the frequency of the color subcarrier, namely 3.58 MHz.

Figure 3:
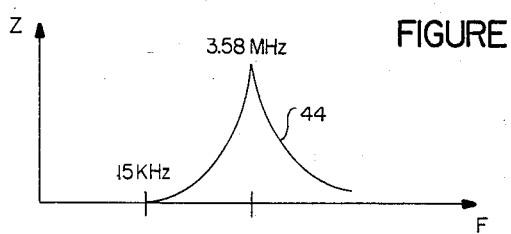
FIG. 3 is a waveform showing the frequency response of a portion of the circuit of FIG. 2.

As is seen in FIG. 3, the tuned circuit has a response characteristic 44, showing changes in impedance Z with changes in frequency F, that is sharply peaked at 3.58 MHz. The 15 KHz synchronizing pulse frequency is marked for illustrative purposes. At or close to the color subcarrier frequency, the impedance of tuned circuit 34 is quite large and serves to isolate transistor 40 from terminal 33. For both lower and higher frequencies, tuned circuit 34 exhibits a progressively smaller impedance as the distance from 3.58 MHz increases. For frequencies where the impedance of tuned circuit 34 is small, transistor 40 acts as a clipper and prevents the voltage at terminal 33 from rising above the voltage established at the base of transistor 40 plus the emitter-base voltage drop of transistor 40. Thus, if the voltage established at the base of transistor 40 is 2.0 volts and its base-emitter drop is 0.7 volts, the maximum voltage permitted at terminal 33 is 2.7 volts. By establishing an appropriate potential at the base of transistor 40, luminance components, such as luminance component 19, in excess of a predetermined threshold voltage will be clipped and not appear at terminals 33 and 20. Chrominance components, however, are unaffected since tuned circuit 34 exhibits a high impedance at those frequencies and isolates transistor 40 from the terminals. Thus, the circuit of the invention is equivalent to that of the prior art without the attendant cost and complexity of the prior art circuit.

It is recognized that numerous modifications and changes in the described embodiment of the invention will be apparent to those skilled in the art without departing from its true spirit and scope. The invention is to be limited only as defined in the claims.

What is claimed is:

1. In combination:
    an input terminal in which is developed a baseband color video signal, including a luminance component and a carrier-based chrominance component;
    first means coupled to said terminal responsive to said chrominance component; and
    second means coupled to said terminal for maintaining the amplitude of signal applied thereto below a predetermined threshold voltage;
    said first means and said second means being connected in a series circuit with said terminal;
    said second means being a clipper for keeping said luminance component below said predetermined threshold voltage;
    said first means rendering said second means ineffective for said chrominance component to maintain the amplitude of said luminance component below said predetermined threshold voltage while enabling passage of said chrominance component in substantially unchanged condition.

2. The combination of claim 1 wherein said second means further includes a transistor and means for establishing a potential at the base of said transistor at a voltage just below said predetermined threshold voltage and wherein said first means includes a circuit tuned to the frequency of said chrominance component, said tuned circuit being connected in a series circuit including said terminal and the emitter-collector path of said transistor.

3. A color video processing circuit comprising:
    an input terminal at which is developed a baseband color video signal including a luminance component and a carrier-based chrominance component;
    a tuned circuit, having a resonant frequency equal to the frequency of the carrier of said carrier-based chrominance component, having one end connected to said terminal;
    a transistor clipper having an emitter-collector path connected in series with the other end of said tuned circuit; and
    voltage divider means for establishing the base of said transistor at a first voltage,
    whereby the luminance component at said terminal is precluded from rising above a threshold voltage determined by said first voltage, while said chrominance component is substantially unaffected.

* * * * *